United States Patent
Nagashima et al.

(10) Patent No.: US 10,302,483 B2
(45) Date of Patent: May 28, 2019

(54) MEASURING DEVICE, MEASURING METHOD, AND PROGRAMS THEREFOR

(71) Applicant: TOPCON CORPORATION, Itabashi-ku (JP)

(72) Inventors: Hiroki Nagashima, Itabashi-ku (JP); Hajime Shinozaki, Itabashi-ku (JP)

(73) Assignee: TOPCON CORPORATION, Tokyo (JP)

( * ) Notice: Subject to any disclaimer, the term of this patent is extended or adjusted under 35 U.S.C. 154(b) by 194 days.

(21) Appl. No.: 15/296,622

(22) Filed: Oct. 18, 2016

(65) Prior Publication Data
US 2017/0115161 A1    Apr. 27, 2017

(30) Foreign Application Priority Data

Oct. 22, 2015 (JP) .................. 2015-207901

(51) Int. Cl.
| | |
|---|---|
| *G06F 11/30* | (2006.01) |
| *G01J 1/42* | (2006.01) |
| *G01S 17/08* | (2006.01) |
| *G01J 1/02* | (2006.01) |

(52) U.S. Cl.
CPC .............. *G01J 1/42* (2013.01); *G01J 1/0228* (2013.01); *G01J 1/0242* (2013.01); *G01J 1/0266* (2013.01); *G01J 1/4204* (2013.01); *G01S 17/08* (2013.01); *G01J 2001/4247* (2013.01)

(58) Field of Classification Search
CPC ....................................................... G01J 1/42
See application file for complete search history.

(56) References Cited

U.S. PATENT DOCUMENTS

2014/0250337 A1* 9/2014 Yamaji .................. G07C 3/00
714/39

FOREIGN PATENT DOCUMENTS

JP          8-15093          1/1996

* cited by examiner

*Primary Examiner* — Phuong Huynh
(74) *Attorney, Agent, or Firm* — XSensus LLP (57) ABSTRACT

The efficiency of the work for measuring electromagnetic waves is increased. A measuring device includes a position information obtaining unit, an electromagnetic wave information obtaining unit, a data storage unit, and a selecting unit. The position information obtaining unit obtains position information of a reflective prism 202, which is measured by a position measuring device 400. The electromagnetic wave information obtaining unit obtains illuminance information measured by an illuminometer 203, which is in the proximity of the reflective prism 202. The data storage unit stores the position information of the reflective prism 202 and the illuminance information in association with each other. The selecting unit compares information of predetermined measurement planned positions with the position information of the reflective prism 202 and selects the illuminance information at a position that has a specific relationship relative to one of the measurement planned positions.

7 Claims, 7 Drawing Sheets

MEASURING DEVICE, MEASURING METHOD, AND PROGRAMS THEREFOR

BACKGROUND OF THE INVENTION

Technical Field

The present invention relates to a technique for measuring electromagnetic waves.

Background Art

Techniques for testing the performance of lighting equipment and lighting facilities are publicly known. One such technique is disclosed in Japanese Unexamined Patent Application Laid-Open No. 8-015093, for example.

SUMMARY OF THE INVENTION

The testing of the performance of lighting facilities should be performed at multiple positions. In addition, operations for identifying measurement positions are complicated and tend to be inefficient. In view of these circumstances, an object of the present invention is to provide a technique for increasing efficiency of work in electromagnetic wave measurement.

A first aspect of the present invention provides a measuring device including a position information obtaining unit, an electromagnetic wave information obtaining unit, a data storage unit, and a selecting unit. The position information obtaining unit is configured to obtain position information of a target, which is measured by a position measuring device. The electromagnetic wave information obtaining unit is configured to obtain electromagnetic wave information measured by an electromagnetic wave measuring device, which has a specific positional relationship relative to the target. The data storage unit is configured to store the position information of the target and the electromagnetic wave information in association with each other. The selecting unit is configured to compare information of predetermined measurement planned positions with the position information of the target and select the electromagnetic wave information at a position that has a specific relationship relative to one of the measurement planned positions.

According to a second aspect of the present invention, in the first aspect of the present invention, the measuring device may also include a synchronization controlling unit that is configured to synchronize a timing of measuring a position of the target by the position measuring device with a timing of measuring an electromagnetic wave by the electromagnetic wave measuring device.

According to a third aspect of the present invention, in the invention according to the first or the second aspect of the present invention, the measuring device may also include an estimating unit that is configured to estimate electromagnetic wave information at one of the measurement planned positions based on the electromagnetic wave information at at least one position adjacent to the one measurement planned position.

A fourth aspect of the present invention provides a measuring method including obtaining position information of a target, which is measured by a position measuring device, obtaining electromagnetic wave information measured by an electromagnetic wave measuring device, which has a specific positional relationship relative to the target, and storing the position information of the target and the electromagnetic wave information in association with each other. The measuring method further includes comparing information of predetermined measurement planned positions with the position information of the target and selecting the electromagnetic wave information at a position that has a specific relationship relative to one of the measurement planned positions.

A fifth aspect of the present invention provides a computer program product including a non-transitory computer-readable medium storing computer-executable program codes for measurement. The computer-executable program codes include program code instructions for obtaining position information of a target, which is measured by a position measuring device, obtaining electromagnetic wave information measured by an electromagnetic wave measuring device, which has a specific positional relationship relative to the target, and storing the position information of the target and the electromagnetic wave information in association with each other. The computer-executable program codes further include program code instructions for comparing information of predetermined measurement planned positions with the position information of the target and selecting the electromagnetic wave information at a position that has a specific relationship relative to one of the measurement planned positions.

According to a sixth aspect of the present invention, in the first aspect of the present invention, the position that has the specific relationship relative to one of the measurement planned positions may be separated from the one measurement planned position by a predetermined threshold value or less and be closest to the one measurement planned position.

According to a seventh aspect of the present invention, in the third aspect of the present invention, the position adjacent to the one measurement planned position may be separated from the one measurement planned position by a predetermined threshold value or less.

According to the present invention, the work for measuring electromagnetic waves is made efficient.

PREFERRED EMBODIMENTS OF THE INVENTION

Outline

Figure 1:
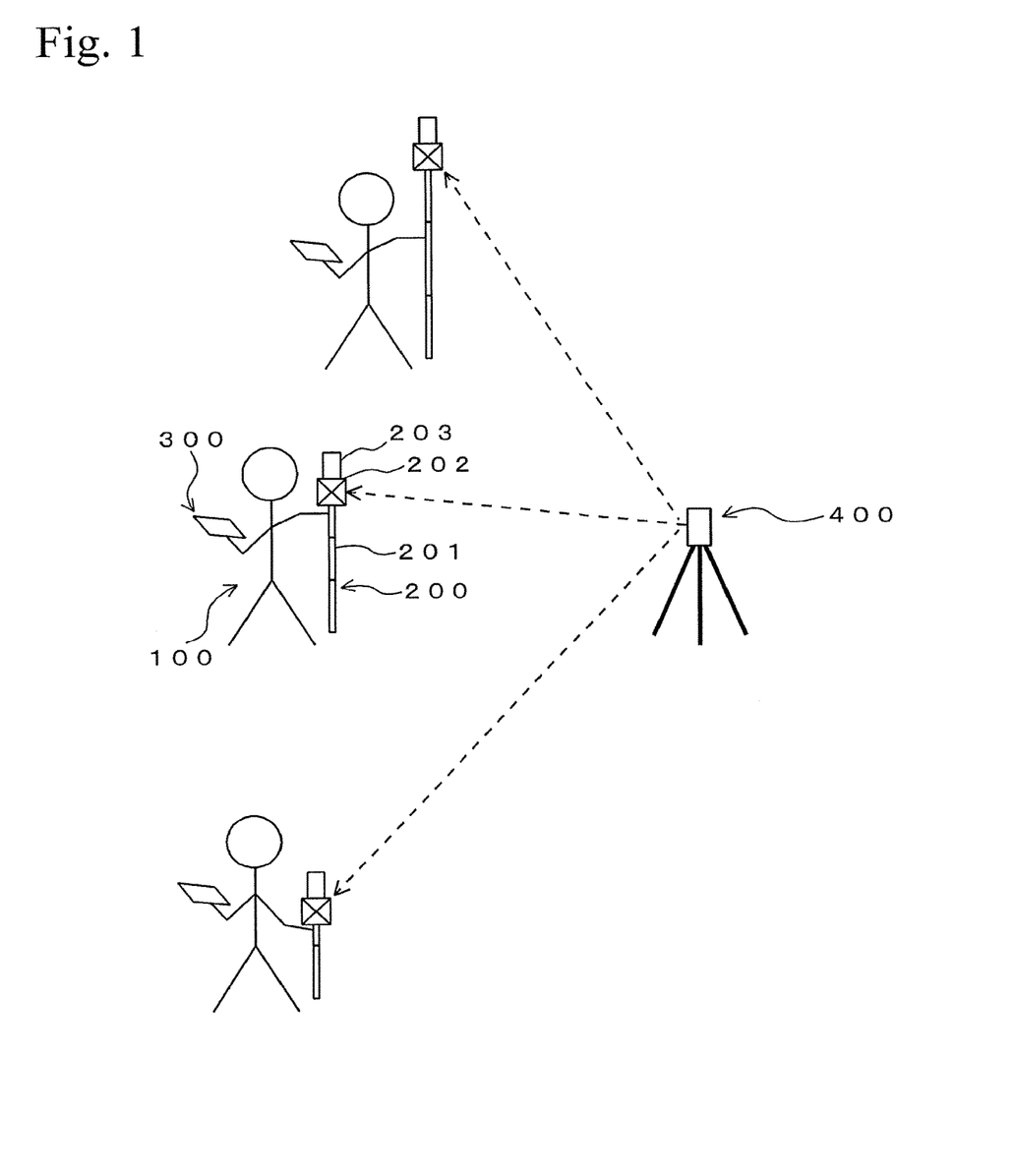
FIG. 1 is a conceptual diagram showing circumstances for measuring illuminance.

FIG. 1 shows an outline of work for measuring illuminance in an embodiment. FIG. 1 conceptually shows a situation in which an operator 100 measures illuminance by using a measuring unit 200. Although a case of measuring illuminance at three positions is shown in FIG. 1, the number of the positions for measuring illuminance is not limited to a specific number.

In this embodiment, illuminance measurement and position measurement are performed at the same time. That is, illuminance is measured by the measuring unit 200, while the position of the measuring unit 200, that is, the measurement position, is measured by a position measuring device 400. Then, the measured illuminance value and the measurement position data are associated with each other and are stored in a terminal 300.

Figure 2:
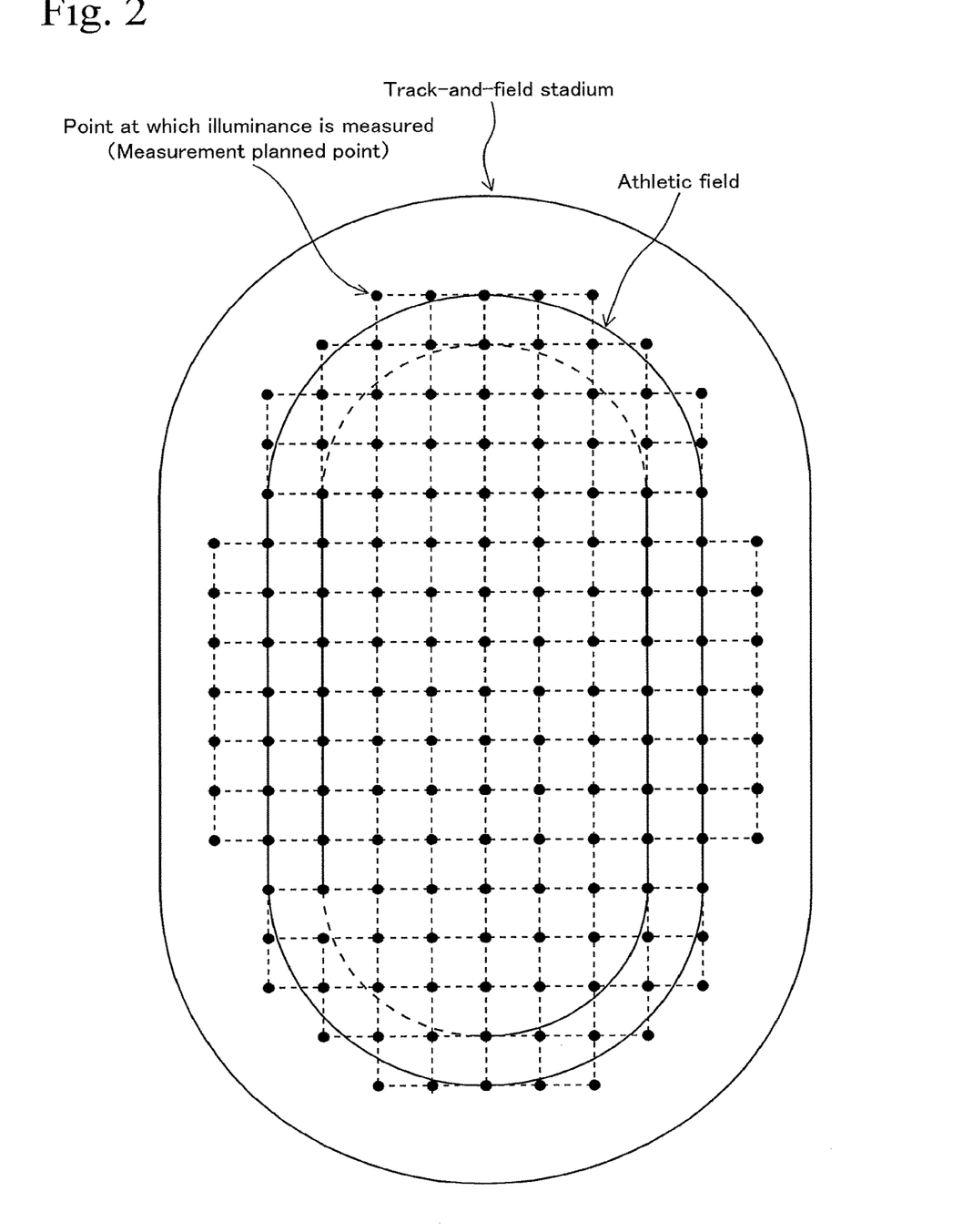
FIG. 2 is a plane view showing measurement planned positions in a track-and-field stadium.

FIG. 2 shows an example of a track-and-field stadium equipped with nighttime lighting facilities. A lot of measurement planned positions are set in a grid in the track-and-field stadium shown in FIG. 2. In this case, the operator 100 moves along a route shown in FIG. 3 and measures illuminance at each of the positions that are expected to be the measurement planned positions, while the lighting facilities (not shown) are operated. The moving route shown in FIG. 3 may not be set to pass the exact measurement planned positions. In this operation, the position at which the illuminance is measured is measured by the position measuring device 400. The measurement position data is transmitted to the terminal 300. The terminal 300 generates data by associating the measured illuminance value with the measurement position data and stores them.

Moreover, the terminal 300 compares the measurement planned positions shown in FIG. 2 (data "A") with the generated data (data "B"), in which the measured illuminance value is associated with the measurement position data. Then, the terminal 300 extracts illuminance data that is measured at a position in the proximity of the measurement planned position. If no such illuminance data is found, illuminance at a selected measurement planned position is estimated from illuminance at at least one position surrounding the selected measurement planned position. According to this method, illuminance data at the measurement planned position is obtained in postprocessing, and therefore, operations for strictly identifying the measurement planned position are unnecessary in the illuminance measurement. Accordingly, the burden on the operator 100 is reduced.

Structure of Hardware (1) Measuring Unit

FIG. 1 shows a measuring unit 200. The measuring unit 200 includes a rod-like support pole 201, a reflective prism 202 that is fixed on a top of the support pole 201, and an illuminometer 203 that is fixed on the reflective prism 202. The reflective prism 202 and the illuminometer 203 are preliminarily set so as to have a known specific positional relationship therebetween. In this embodiment, the reflective prism 202 and the illuminometer 203 are arranged close to each other, for example, at a distance of 25 centimeters or less, so as to be treatable as being at the same position. If the reflective prism 202 is separated from the illuminometer 203, the separated distance is measured as an offset value. Then, the measurement position of the reflective prism 202 is corrected with the offset value, and the position of the illuminometer 203 is determined.

The support pole 201 is extendable, and the operator can adjust the heights of the reflective prism 202 and the illuminometer 203 to desired positions. The support pole 201 can be extended and retracted by a structure that is manually operated by the operator. Alternatively, the extending and the retracting of the support pole 201 may be performed by each type of actuator or an electric motor.

The reflective prism 202 is a target used for measuring a position using laser light and reflects measurement laser light to a position measuring device 400. The measurement laser light is emitted from the position measuring device 400. The illuminometer 203 is an example of an electromagnetic wave measuring device and measures illuminance of light of lighting equipment. The illuminometer 203 is connected to the terminal 300, which is carried by the operator, and the illuminometer 203 operates by control via the terminal 300. Illuminance data measured with the illuminometer 203 is stored in the terminal 300. In some cases, the terminal 300 may be mounted on the support pole 201 so that the terminal 300 will move together with the measuring unit 200.

(2) Position Measuring Device

The position measuring device 400 emits measurement laser light to the surroundings while scanning. The measurement laser light hitting the reflective prism 202 is reflected thereat, and the reflected light is received by the position measuring device 400. The position measuring device 400 calculates a direction and a distance from the position measuring device 400 to the reflective prism 202 based on the emitting direction and propagation time of the measurement laser light. Thus, a relative positional relationship of the reflective prism 202 with respect to the position measuring device 400 is determined. The position of the position measuring device 400 is determined in advance so that information of the position of the reflective prism 202 will be obtained. In this embodiment, the position of the position measuring device 400 is determined in advance in a measurement field, that is, a measurement target place, in which illuminance is to be measured. For example, one or multiple reference points of which positions are precisely determined are provided in the measurement field, and the position measuring device 400 is arranged at the reference point. Thus, the position of the position measuring device 400 in the measurement field is preliminarily known. Alternatively, the position of the position measuring device 400 may be preliminarily measured by using a high precision GNSS device or the like.

Figure 4:
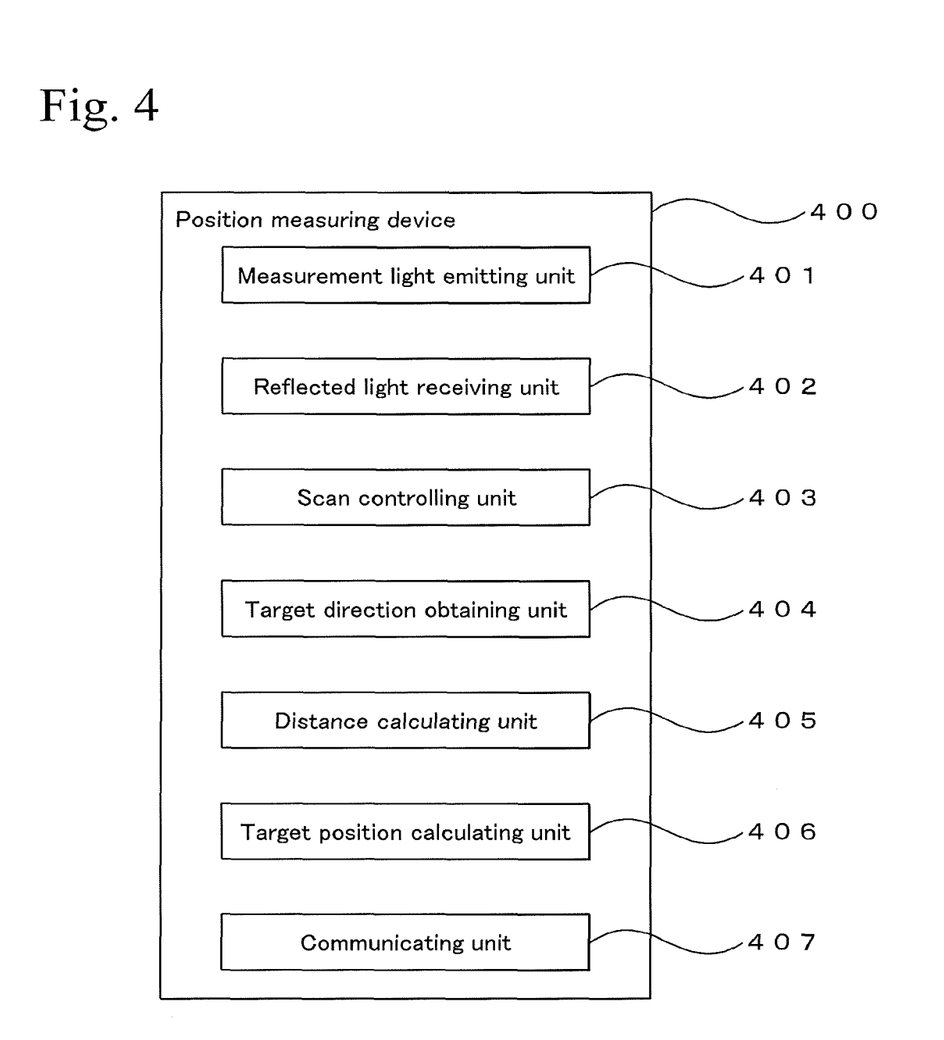
FIG. 4 is a block diagram of a position measuring device in an embodiment.

FIG. 4 shows a block diagram of the position measuring device 400. The position measuring device 400 includes a measurement light emitting unit 401, a reflected light receiving unit 402, a scan controlling unit 403, a target direction obtaining unit 404, a distance calculating unit 405, a target position calculating unit 406, and a communicating unit 407. The measurement light emitting unit 401 emits distance measurement laser light to the surroundings while scanning. The reflected light receiving unit 402 receives measurement light that has hit a target and has been reflected thereat. The target is the reflective prism 202 shown in FIG. 1. The measurement light emitting unit 401 and the reflected light receiving unit 402 are mounted on a rotatable table, whereby both emission of the measurement light and reception of the reflected light can be performed while the surroundings are scanned.

The scan controlling unit 403 controls the scanning using the measurement light. For example, the scan controlling unit 403 controls scan timing, scan direction, and emission timing of the measurement laser light. The target direction obtaining unit 404 obtains a direction of the target (in this case, the reflective prism 202) as viewed from the position measuring device 400, based on the emitting direction of the measurement light or the incident direction of the reflected light. The distance calculating unit 405 calculates a distance from the position measuring device 400 to the target based on a flight time (propagation time) and the speed of the measurement light.

The target position calculating unit 406 calculates the position of the target with respect to the position measuring device 400 based on the direction of the target as viewed from the position measuring device 400 and based on the distance between the position measuring device 400 and the target. Here, in a condition in which the position of the position measuring device 400 in the measurement field is already known, the position of the target (reflective prism 202 in FIG. 1) in the measurement field is determined.

For example, it is assumed that a position $P_0(x', y', z')$ of the position measuring device 400 in the measurement field is known and that data of this known position is input in the position measuring device 400. In this case, a three-dimensional coordinate system having an origin at the position of the position measuring device 400 is used. Then, a measured position of the reflective prism 202 in the three-dimensional coordinate system is represented by $P_1(x, y, z)$, and a position (coordinates) P of the reflective prism 202 in the measurement field is calculated from the formula; $P=P_0+P_1$. This calculation is also performed by the target position calculating unit 406. Alternatively, the value of $P_0$ may be preliminarily input in the terminal 300, and the calculation for obtaining the position P may be performed by the terminal 300. In a case in which the absolute position of the position measuring device 400 is known, the absolute position of the target is calculated.

The communicating unit 407 wirelessly communicates with the terminal 300. Any wireless communication standard can be used. For example, a communication standard such as Wi-Fi, Bluetooth (registered trademark), various types of wireless LANs, mobile phone network, or the like, may be used. The communicating unit 407 transmits data of the position of the target (the reflective prism 202 in FIG. 1) to the terminal 300. The data of the position of the target is calculated by the target position calculating unit 406. The data of preliminarily calculated or predetermined position of the position measuring device 400 is input in the position measuring device 400 via the communicating unit 407.

Techniques relating to the position measuring device 400 are disclosed in Japanese Unexamined Patent Applications Laid-Open Nos. 2015-040831 and 2010-237169, for example.

(3) Terminal

As shown in FIG. 1, the operator 100 carries the terminal 300. The terminal is a commercially available tablet that can be used as a mobile general purpose computer. The terminal includes a CPU, a memory, and various types of interfaces. A dedicated terminal may be prepared and be used for the terminal 300 instead of using a general purpose computer. The operator 100 performs work relating to illuminance measurement by using the terminal 300.

Figure 5:
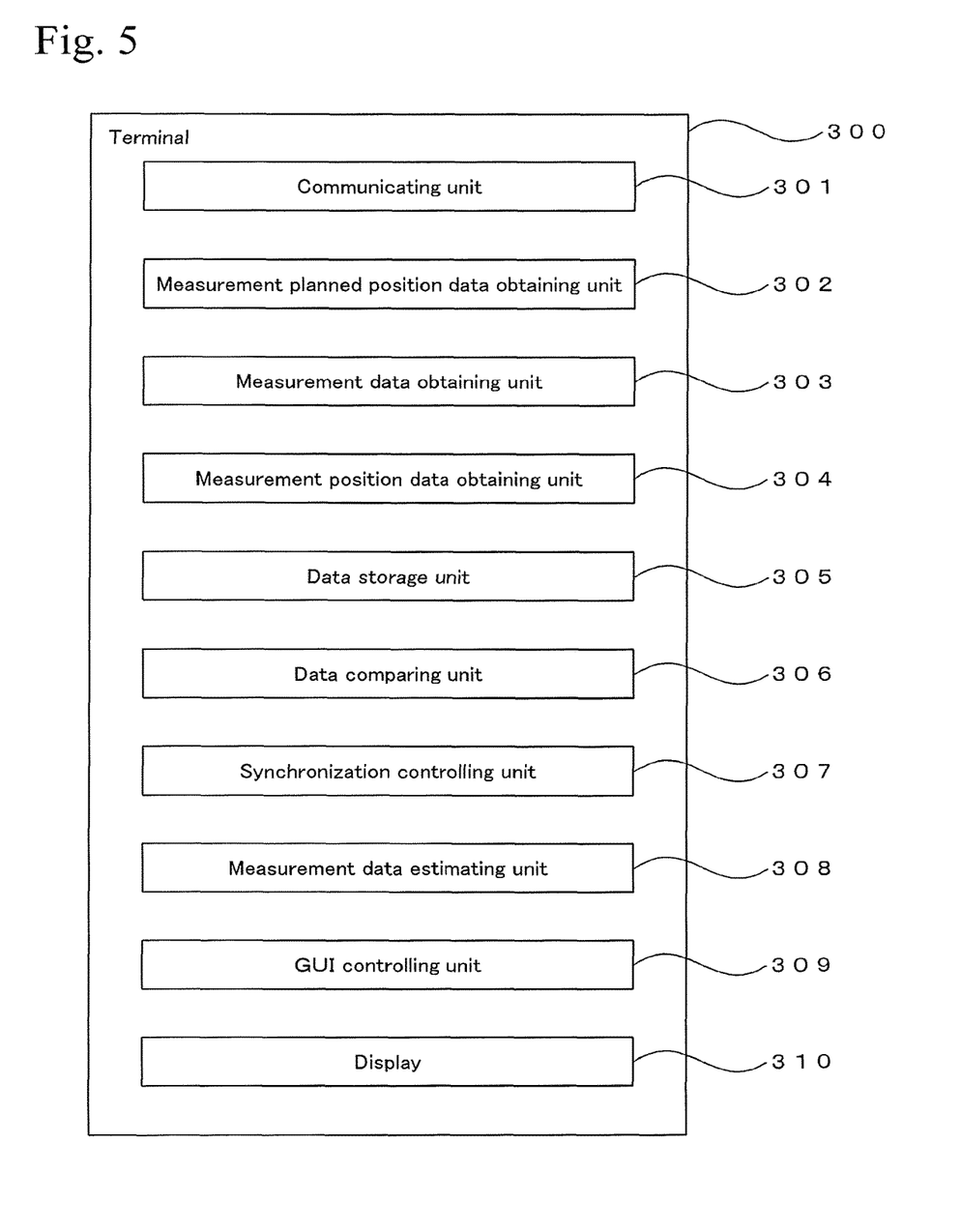
FIG. 5 is a block diagram of a terminal in an embodiment.

The terminal 300 includes a communicating unit 301, a measurement planned position data obtaining unit 302, a measurement data obtaining unit 303, a measurement position data obtaining unit 304, a data storage unit 305, a data comparing unit 306, a synchronization controlling unit 307, a measurement data estimating unit 308, a GUI controlling unit 309, and a display 310. In this embodiment, the communicating unit 301 and the display 310 are constructed of hardware that is equipped on the tablet, and the other functional units are constructed by software and are operated such that the CPU executes specific programs.

At least one of the functional units shown in FIG. 5 may be composed of a dedicated circuit. For example, each of the functional units shown in FIG. 5 may be composed of electronic circuits such as a CPU (Central Processing Unit), an ASIC (Application Specific Integrated Circuit), and a PLD (Programmable Logic Device) such as an FPGA (Field Programmable Gate Array).

Whether each of the functional units is to be constructed of dedicated hardware or is to be constructed of software so that programs are executed by a CPU, is selected in consideration of necessary operating speed, production cost, amount of electric power consumption, and the like. For example, a specific functional unit composed of an FPGA provides a superior operating speed but is high in production cost. On the other hand, a specific functional unit that is configured so that programs are executed by a CPU can be made by using general purpose hardware and is thereby low in production cost. However, a functional unit constructed by using a CPU provides an operating speed that is inferior to the operating speed of dedicated hardware. Moreover, such a functional unit may not be able to perform complicated operation. Constructing the functional unit by dedicated hardware and constructing the functional unit by software differ from each other as described above, but are equivalent to each other from the viewpoint of obtaining a specific function. Alternatively, multiple functional units may be composed of one circuit.

The communicating unit 301 communicates with the position measuring device 400 (refer to FIGS. 1 and 4) and other devices. Each type of publicly known standards may be used as the communication standard. The measurement planned position data obtaining unit 302 obtains data of measurement planned positions, which are candidate positions at each of which illuminance is to be measured. For example, data of the measurement planned positions shown in FIG. 2 is described as the data relating to the measurement planned positions. The measurement planned positions, at each of which illuminance is to be measured are determined in advance and are input in the terminal 300 via the communicating unit 301. Naturally, data of the measurement planned positions may be input in the terminal 300 via a publicly known storage medium, such as a USB memory or the like. The input data of the measurement planned positions is stored in the data storage unit 305.

The measurement data obtaining unit 303 obtains illuminance data that is measured by the illuminometer 203. The measurement position data obtaining unit 304 obtains measurement position data of the reflective prism 202, which is measured by the position measuring device 400. In this embodiment, the position of the reflective prism 202 is treated as the position of the illuminometer 203. The measurement position data of the reflective prism 202 (illuminometer 203), which is measured by the position measuring device 400, is received by the communicating unit 301 and is transmitted to the measurement position data obtaining unit 304.

The data storage unit 305 stores data in which the illuminance data is associated with the measurement position data of the reflective prism 202 (illuminometer 203). The illuminance data is measured by the illuminometer 203 and is received by the measurement data obtaining unit 303. The measurement position data is received by the measurement position data obtaining unit 304. That is, the data storage unit 305 stores data, in which a measured illuminance value is associated with the measurement position data. Table 1 shows examples of data stored in the data storage unit 305.

TABLE 1

| Date and time of measurement | Illuminance (lx) | Measurement position |
|---|---|---|
| Oct. 12 14:08 | 120.3 | $X_1, Y_1$ |
| Oct. 12 14:11 | 119.4 | $X_2, Y_2$ |
| Oct. 12 14:13 | 109.7 | $X_3, Y_3$ |
| Oct. 12 14:16 | 111.5 | $X_4, Y_4$ |
| Oct. 12 14:18 | 117.3 | $X_5, Y_5$ |
| Oct. 12 14:21 | 123.2 | $X_6, Y_6$ |
| Oct. 12 14:24 | 118.7 | $X_7, Y_7$ |

Table 1 shows measured illuminance values respectively associated with measurement position data. The illuminance values shown in Table 1 are measured by the illuminometer 203. The measurement position data is data of the position at which the corresponding illuminance is measured and is measured by the position measuring device 400. These two kinds of data are measured by different measuring devices but are associated with each other because the position of the reflective prism 202 is measured by the position measuring device 400 in accordance with a timing of measuring illuminance by the illuminometer 203. Additionally, the data storage unit 305 also stores various kinds of data that are necessary for operating the terminal 300.

The data comparing unit 306 compares the data as exemplified in Table 1, in which the measured illuminance values are associated with the measurement position data, with the data of the measurement planned positions. Then, the data comparing unit 306 selects illuminance data that is measured at a position close to the measurement planned position. The selection is performed by using a threshold value to judge a distance between a measurement position and the measurement planned position.

Hereinafter, an example of processing that is performed by the data comparing unit 306 is described. Here, it is assumed that a threshold value is set at 50 centimeters. First, a specific measurement planned position is selected. Then, the illuminance value at a measurement position that is 50 centimeters or less from the selected measurement planned position is selected in Table 1. If there are multiple measurement positions that satisfy the above condition, the illuminance value at the measurement position closest to the selected measurement planned position is selected.

The synchronization controlling unit 307 controls synchronization between the illuminance measurement and the position measurement of the reflective prism 202. The illuminance measurement is performed by the illuminometer 203. The position measurement of the reflective prism 202 is performed by the position measuring device 400. The synchronization may not be perfectly performed, but is preferably performed as perfectly as possible.

The measurement data estimating unit 308 estimates an illuminance value at the selected measurement planned position when the data comparing unit 306 selects no measured illuminance value, that is, when there is no measurement position that is in the proximity of the selected measurement planned position. The degree of the proximity is judged by using the threshold value. The estimation is performed based on the illuminance values at the measurement positions in the proximity of the selected measurement planned position.

In this calculation, multiple measurement positions in the proximity of the selected measurement planned position are selected, and an average of the illuminance values at the selected multiple measurement positions is calculated. For example, four positions are selected among the measurement positions in the proximity of the selected measurement planned position, and an average of the illuminance values at the four positions is calculated. Thus, the average of the illuminance values is used as an estimated illuminance value at the selected measurement planned position. If there is only one available measurement position that is in the proximity of the selected measurement planned position, the illuminance value at the one measurement position may be used as the estimated illuminance value.

The GUI controlling unit 309 controls a GUI (Graphical User Interface) by using the display 310. The display 310 is a liquid crystal display with a touch panel function. This function utilizes the function of a commercially available tablet. The operator 100 controls the terminal 300 by using the GUI function via the display 310.

Measurement Processing

Figure 6:
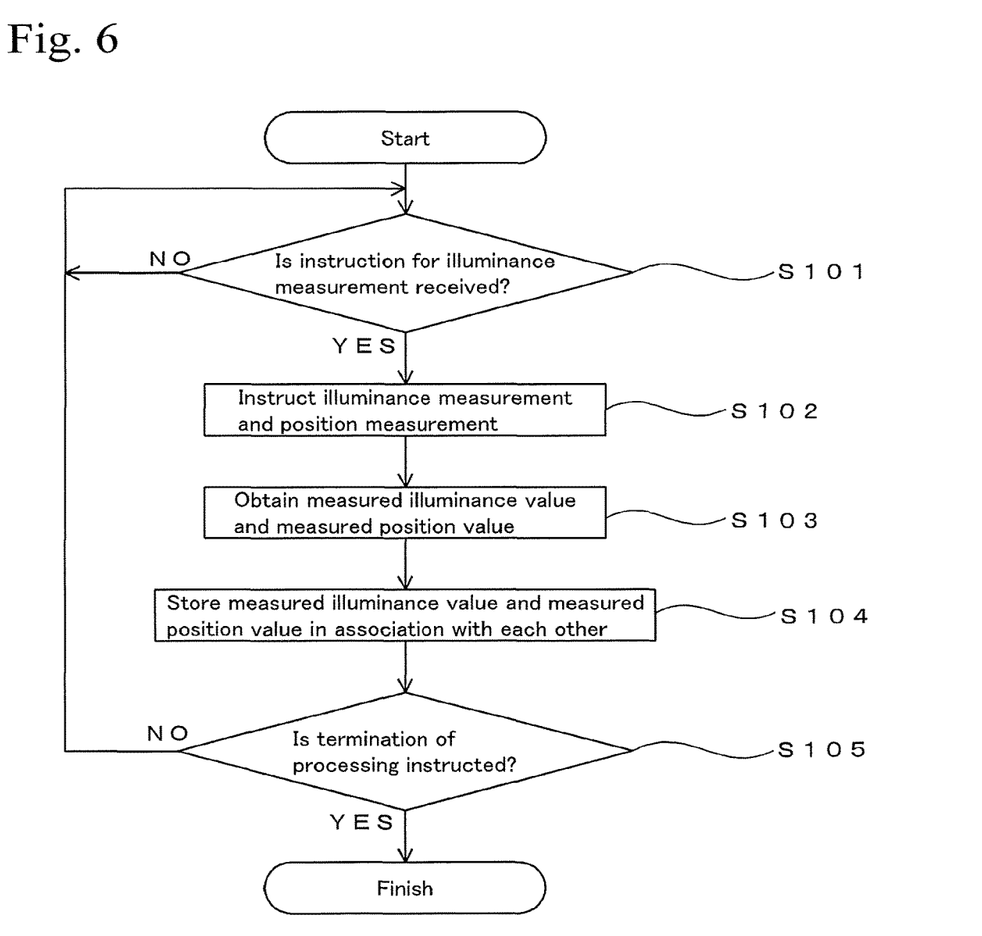
FIG. 6 is a flow chart showing an example of a processing procedure.

Here, an example of measuring illuminance of a lighting facility in a track-and-field stadium, which is exemplified in FIG. 2 as a measurement field, is described. FIG. 6 shows an example of a processing procedure that is executed by the terminal 300. Programs for executing the processing shown in FIG. 6 are stored in at least one of the data storage unit 305 and an appropriate storage region and are executed by a CPU equipped in the terminal 300. Alternatively, the programs may be stored in an appropriate storage medium, such as a USB memory or the like, and may be provided therefrom. This is the same as in the case of programs for executing the processing shown in FIG. 7.

Figure 3:
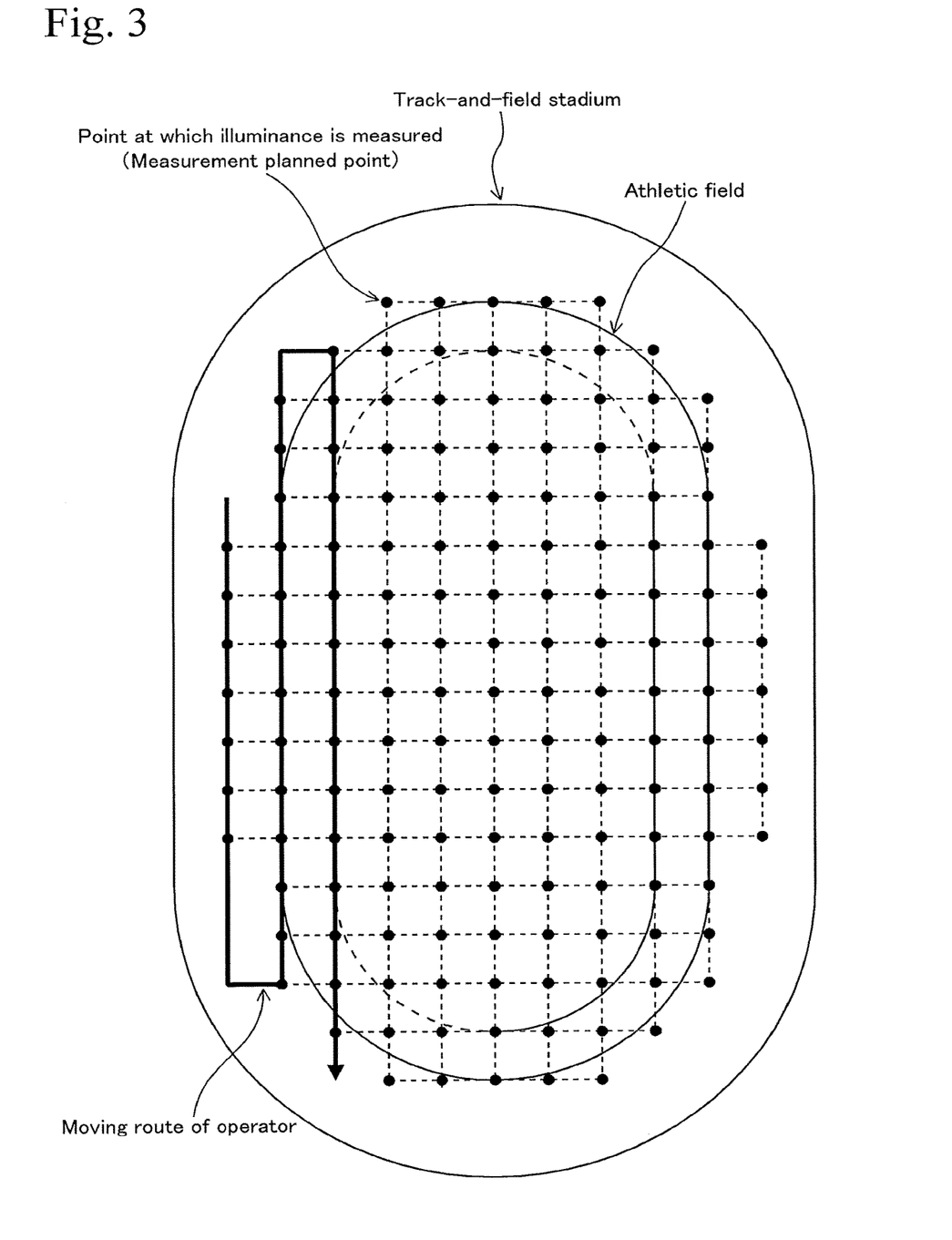
FIG. 3 is a plane view showing a moving route of an operator in the track-and-field stadium in FIG. 2.

First, the operator 100 (refer to FIG. 1) measures illuminance along the route shown in FIG. 3 by using the measuring unit 200. At this time, the operator 100 selects a moving route that passes approximately the measurement planned positions and also selects approximate measurement positions for the measurement planned positions.

The operator 100 controls the terminal 300 and measures illuminance by using the illuminometer 203. When the terminal 300 is instructed to make the illuminometer 203 measure illuminance (step S101), a signal for instructing the illuminance measurement is output to the illuminometer 203 while a signal for instructing the position measurement of the reflective prism 202 is output to the position measuring device 400 (step S102). In this example, these signals are output from the synchronization controlling unit 307 shown in FIG. 5.

Then, the illuminometer 203 measures an illuminance value, and the position measuring device 400 measures a position value of the reflective prism 202. Thereafter, these measured values are obtained (step S103). The illuminance data is obtained by the measurement data obtaining unit 303. The position data is obtained by the measurement position data obtaining unit 304.

After the illuminance data and the position data are obtained, these data are associated with each other and are stored in the data storage unit 305 (step S104). In the processing of this step, the illuminance value measured by the illuminometer 203 is stored in association with the position of the reflective prism 202 measured by the position measuring device 400, as shown in Table 1, for example. The position is measured synchronously with the illuminance measurement.

Next, whether the operator 100 controls for instructing the termination of the processing is judged (step S105). If the termination of the processing is instructed, the processing is terminated. Otherwise, the processing in step S101 and the subsequent steps is repeated.

Postprocessing

Figure 7:
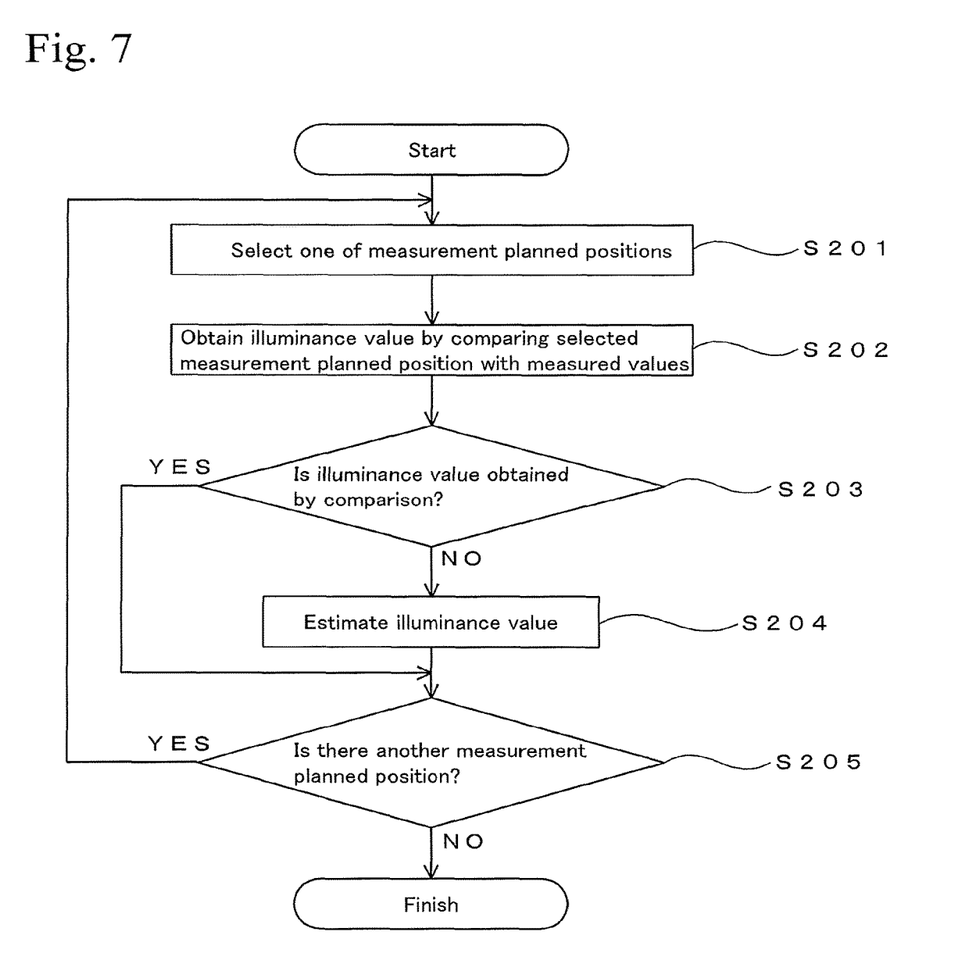
FIG. 7 is a flow chart showing an example of a processing procedure.

After the measurement operation is finished, the processing shown in FIG. 7 is performed by the terminal 300. After the processing is started, one of the preliminarily obtained measurement planned positions is selected (step S201). Next, the data of the measurement planned position, which is selected in step S201, is compared with the data that is stored in step S104. Consequently, a measurement position coinciding with or in the proximity of the selected measurement planned position is obtained, and the illuminance value at the obtained measurement position is obtained (step S202). At this time, the degree of the proximity is judged by using a predetermined threshold value. The processing of this step is performed by the data comparing unit 306.

Then, whether the illuminance value at the selected measurement planned position is obtained in step S202 is judged (step S203). If the illuminance value at the selected measurement planned position is not obtained, an illuminance value is estimated (step S204). Otherwise, the processing advances to step S205.

The illuminance value is estimated as described below. First, all of illuminance values that are respectively measured at positions in the proximity of the selected measurement planned position are obtained. The positions are separated from the selected measurement planned position by a predetermined distance or less. Next, an average of the obtained illuminance values is calculated. Then, the average is used as an estimated value.

After the illuminance value is estimated, the processing advances to step S205. In the processing in step S205, it is judged whether another measurement planned position that is still not selected. If there is another measurement planned position, the processing in step S201 and the subsequent steps is repeated. Otherwise, the processing is finished.

Advantages

The above described method eliminates the need for the operations for strictly identifying the measurement position when the operator 100 (refer to FIG. 1) measures illuminance. Alternatively, the above described method allows a simple operation for identifying the measurement position. Accordingly, the efficiency of the work for measuring illuminance is increased.

Other Matters

Data such as of chromaticity, wavelength distribution characteristic, or the like, may be measured in addition to the illuminance. Moreover, the present invention can be used in a technique for measuring electromagnetic waves for communication, such as radio waves of a wireless LAN, radiation such as gamma rays, light in the invisible ultraviolet region or infrared region, electromagnetic waves generated by high-voltage transmission lines or high-voltage electric equipment, etc.

The field where the measurement is performed is not limited to specific places and can be selected from rooms for particular work, classrooms, lecture halls, event facilities, libraries, various types of public spaces, commercial facilities, rooms for public transportation, etc.

A part of the functional units of the terminal 300 shown in FIG. 5 may be performed by a separate external unit. In such cases, the present invention can be understood as a system.

The reflective prism 202 and the illuminometer 203 are arranged so as to have a specific positional relationship such that they are integrally arranged.

What is claimed is:

1. A measuring device for measuring illuminance of light from a lighting facility in a field, the device comprising:
   circuitry configured to
   obtain a position in the field of a reflective prism, which is measured by a position measuring device that measures a position of the reflective prism by using distance measuring light reflected back from the reflective prism;
   obtain an illuminance of the light from the lighting facility, which is measured by an illuminometer of a device that has the reflective prism; and
   store information of the obtained position in the field of the reflective prism, and information of the illuminance of the light from the lighting facility in association with each other.

2. The measuring device according to claim 1, further comprising:
   a synchronization controlling unit that synchronizes a timing of measuring a position of the reflective prism by the position measuring device with a timing of measuring an illuminance by the illuminometer.

3. The measuring device according to claim 1, further comprising:
   an estimating unit that estimates an illuminance of the light from the lighting facility at a measurement planned position by using an average of values of the illuminance measured at multiple positions in proximity of the predetermined measurement planned position as an estimated illuminance.

4. A measuring method for measuring illuminance of light from a lighting facility in a field, the method comprising:
   obtaining a position in the field of a reflective prism, which is measured by a position measuring device that measures a position of the reflective prism by using distance measuring light reflected back from the reflective prism;
   obtaining an illuminance of the light from the lighting facility, which is measured by an illuminometer of a measuring unit that has the reflective prism; and
   storing information of the position in the field of the reflective prism and information of the illuminance of the light from the lighting facility in association with each other.

5. A computer program product comprising a non-transitory computer-readable medium storing computer-executable program codes for measuring illuminance of light from a lighting facility in a field, the computer-executable program codes comprising program code instructions for:
   obtaining a position in the field of a reflective prism, which is measured by a position measuring device that measures a position of the reflective prism by using distance measuring light reflected back from the reflective prism;
   obtaining an illuminance of the light from the lighting facility, which is measured by an illuminometer of a measuring unit that has the reflective prism; and
   storing information of the position in the field of the reflective prism and information of the illuminance of the light from the lighting facility in association with each other.

6. The measuring device according to claim 1, wherein the circuitry is further configured to synchronize a timing of measuring a position of the reflective prism by the position measuring device with a timing of measuring an illuminance by the illuminometer.

7. The measuring device according to claim 1, wherein the circuitry is further configured to estimate an illuminance of the light from the lighting facility at a measurement planned position by using an average of values of the illuminance measured at multiple positions in proximity of the predetermined measurement planned position as an estimated illuminance.

* * * * *